(12) United States Patent
Lim et al.

(10) Patent No.: US 11,982,465 B2
(45) Date of Patent: May 14, 2024

(54) HEAT EXCHANGE UNIT FOR VENTILATION DEVICE

(71) Applicant: AMOGREENTECH CO., LTD., Gimpo-si (KR)

(72) Inventors: Hyun Chul Lim, Gwangmyeong-si (KR); Jae Yeong Lee, Seoul (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 631 days.

(21) Appl. No.: 17/276,738

(22) PCT Filed: Sep. 11, 2019

(86) PCT No.: PCT/KR2019/011791
§ 371 (c)(1),
(2) Date: Mar. 16, 2021

(87) PCT Pub. No.: WO2020/060102
PCT Pub. Date: Mar. 26, 2020

(65) Prior Publication Data
US 2022/0042690 A1    Feb. 10, 2022

(30) Foreign Application Priority Data

Sep. 18, 2018  (KR) .................. 10-2018-0111653

(51) Int. Cl.
*F24F 7/013*   (2006.01)
*F24F 12/00*   (2006.01)
*F28D 9/00*    (2006.01)

(52) U.S. Cl.
CPC ............ *F24F 7/013* (2013.01); *F24F 12/006* (2013.01); *F28D 9/0062* (2013.01); *F24F 2221/20* (2013.01)

(58) Field of Classification Search
CPC ...... F24F 7/013; F24F 12/006; F24F 2221/20; F28D 9/0062; F28D 21/0014; F28F 3/025; Y02B 30/56
See application file for complete search history.

(56) References Cited

U.S. PATENT DOCUMENTS 9,901,760 B2 *   2/2018  Erb ..................... A62C 2/065
2003/0051864 A1 *  3/2003  Lundgren ............. H05K 7/206
                                                        165/122

(Continued)

FOREIGN PATENT DOCUMENTS

JP    2001280656    10/2001
KR   20090056443     6/2009

(Continued)

OTHER PUBLICATIONS

International Search Report—PCT/KR2019/011791 dated Dec. 24, 2019.

*Primary Examiner* — Kun Kai Ma
(74) *Attorney, Agent, or Firm* — CANTOR COLBURN LLP

(57) ABSTRACT

A heat exchange unit for a ventilation device includes: a case having a first inlet port through which first air is sucked and a second outlet port through which second air is discharged formed on a front side, and a first outlet port through which the first air is discharged and a second inlet port through which the second air is sucked formed on a back side; and heat exchangers having a first air passage through which the first air passes and a second air passage through which the second air passes formed thereon. A first separation plate for separating the first inlet port and the second outlet port is installed in the height direction on the front side of the case. A second separation plate for separating the second inlet port and the first outlet port is installed in the height direction on the other side of the case.

9 Claims, 7 Drawing Sheets

(56) References Cited

U.S. PATENT DOCUMENTS

| | | | | |
|---|---|---|---|---|
| 2004/0250557 | A1* | 12/2004 | Yabu | F24F 3/147 |
| | | | | 62/271 |
| 2011/0036541 | A1 | 2/2011 | Takada et al. | |
| 2011/0189937 | A1 | 8/2011 | Hasegawa et al. | |
| 2014/0260362 | A1* | 9/2014 | Jung | F28D 9/0081 |
| | | | | 165/135 |
| 2014/0262125 | A1* | 9/2014 | Erb | F28F 13/003 |
| | | | | 165/10 |
| 2022/0113042 | A1* | 4/2022 | Horie | F24F 1/0358 |

FOREIGN PATENT DOCUMENTS

| | | | |
|---|---|---|---|
| KR | 1263656 | B1 * | 5/2013 |
| KR | 101263656 | | 5/2013 |

\* cited by examiner

HEAT EXCHANGE UNIT FOR VENTILATION DEVICE

TECHNICAL FIELD

The present invention relates to a heat exchange unit for a ventilation device for exchanging heat between outdoor air and indoor air.

BACKGROUND ART

In general, a ventilation device discharges polluted indoor air to the outside and supplies fresh outdoor air to the indoor space. The ventilation device includes a filter for filtering various harmful substances contained in the outdoor air, and a heat exchanger for heat-exchanging indoor air and outdoor air to minimize a change in the indoor temperature during ventilation.

The ventilation device can be divided into a window type ventilation device installed in a window, and a duct type ventilation device installed in the building, according to an installation place.

The window type ventilation device is installed in a window frame after opening an existing window, and the duct type ventilation device is installed on the ceiling and is connected to the outside by a duct.

A conventional heat exchanger for a ventilation device includes: heat transfer plates that are stacked at a constant interval; first heat transfer members between the heat transfer plates and formed in a corrugated shape to form a first air passage through which the outdoor air passes; and second heat transfer members stacked between the heat transfer plates to cross the first heat transfer members and formed in a corrugated shape to form a second air passage through which the indoor air passes.

The first air passage and the second air passage are required to have a sufficient area through which the air for ventilation can pass, and thus the height of the heat exchanger becomes high.

When the height of the heat exchanger increases, the installation height on the ceiling is increased in the case of a duct type ventilation device. When the duct type ventilation device is installed, the ventilation device can be exposed to the indoor room. In the case of the window type ventilation device, the area occupied by the ventilation device at the window is increased, so that the visibility of the window and the transmission of sunlight are reduced.

DISCLOSURE

Technical Problem

Accordingly, it is an object of the present invention to provide a heat exchange unit for a ventilation device capable of arranging a plurality of heat exchangers in a horizontal direction to lower the entire height of the heat exchangers and minimize the installation space.

It is another object of the present invention to provide a heat exchange unit for a ventilation device capable of simplifying a pipe connection structure since an inlet port and an outlet port communicating with a first air passage and a second air passage of a plurality of heat exchangers can be formed in a single passage.

Technical Solution

According to one embodiment of the present invention, a first inlet port through which first air is sucked and a second outlet port through which second air is discharged are formed on a front side of a case, and a first outlet port through which the first air is discharged and a second inlet port through which the second air is sucked are formed on a back side the case. A plurality of heat exchangers are arranged in a horizontal direction inside the case, and the first inlet port and the second outlet port are partitioned in a vertical direction on the front surface of the case, and the second inlet port and the first outlet port can be partitioned up and down on the rear surface of the case.

The plurality of heat exchangers may be arranged in diagonal directions in the case.

A first separation plate is installed on the front surface of the case in the height direction of the heat exchanger to separate the first inlet port and the second outlet port, and a second separation plate is installed on the rear surface of the case in the height direction of the heat exchanger to separate the second inlet port and the first outlet port.

The rear surface of the case is partitioned by the second separation plate in the height direction. In addition, one second inlet port may be formed on the upper portion of the front surface of the case, and one first outlet port may be formed on the lower portion of the rear surface of the case.

The first air passage and the first inlet port of the plurality of heat exchangers can communicate with each other, and the second air passage and the first inlet port of the plurality of heat exchangers can be blocked by a first blocking plate.

The first air passage and the first outlet port of the plurality of heat exchangers can communicate with each other, and the second air passage and the first outlet port of the plurality of heat exchangers can be blocked by a fourth blocking plate.

The second air passage and the second outlet port of the plurality of heat exchangers can communicate with each other, and the first air passage and the second outlet port of the plurality of heat exchangers can be blocked by a second blocking plate.

The second air passage and the second inlet port of the plurality of heat exchangers can communicate with each other, and the first air passage and the second inlet port of the plurality of heat exchangers can be blocked by a third blocking plate.

The plurality of heat exchangers may comprise: a first heat exchange unit comprising a first corrugated plate having a corrugated shape to form a first air passage, and a flat plate arranged to surround a lower surface, both side surfaces, and an upper surface of the first corrugated plate to partition between the first air passage and the second air passage; and a second heat exchange unit alternately stacked with the first heat exchange unit and including a second corrugated plate having a corrugated shape to form the second air passage.

Advantageous Effects

As described above, in the present invention, a plurality of heat exchangers are arranged in a horizontal direction to lower the entire height of the heat exchangers, and a space occupied by the plurality of heat exchangers in the window can be minimized by arranging the heat exchangers upright in a vertical direction with respect to a vertical frame of a window.

In addition, the first inlet port and the second outlet port formed on the front surface of the case of the heat exchange unit are partitioned up and down to form one passage, and the second inlet port and the first outlet formed on the rear surface of the case are partitioned up and down to form one passage, thereby simplifying the pipe connection structure.

BEST MODE

Figure 1:
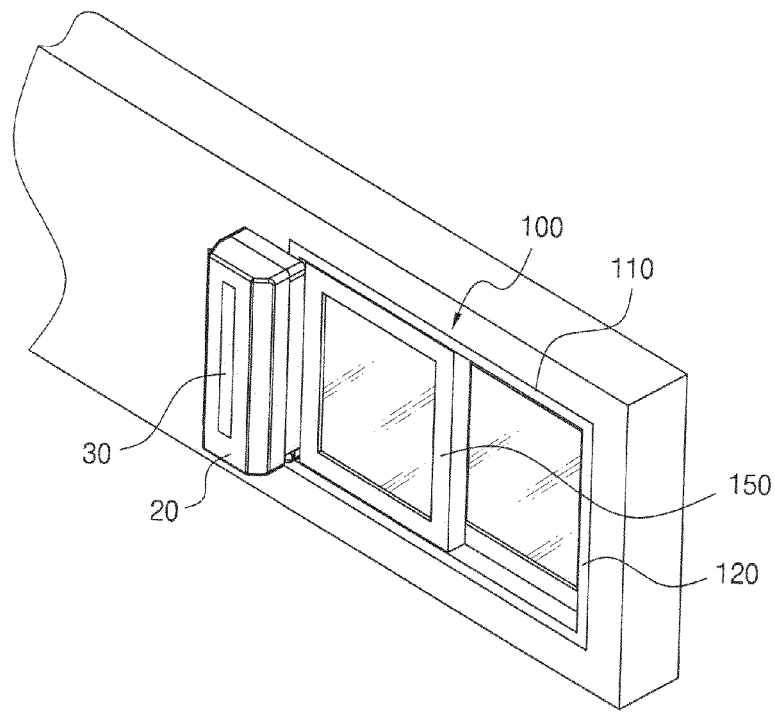
FIG. 1 is a perspective view of a ventilation device according to an embodiment of the present invention, in which the ventilation device is installed in a window frame.

Hereinafter, embodiments of the present invention will be described in detail with reference to the accompanying drawings. The sizes and shapes of the components shown in the drawings may be exaggerated for clarity and convenience.

Figure 2:
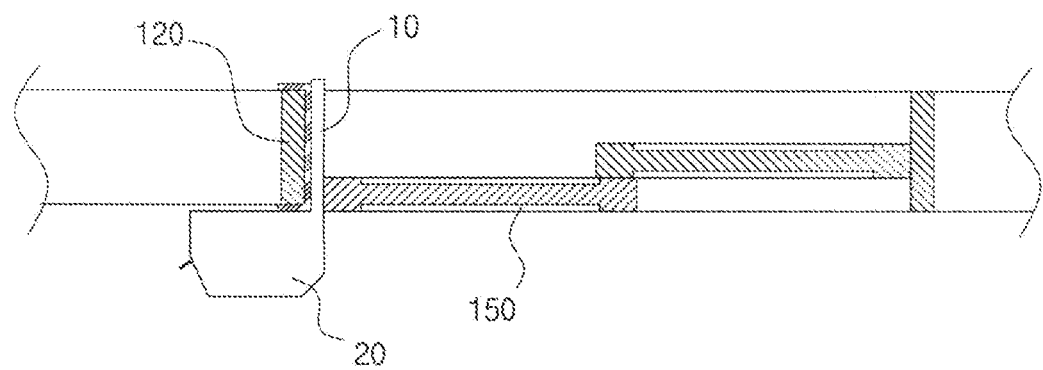
FIG. 2 is a cross-sectional view of a ventilation device according to an embodiment of the present invention, in which the ventilation device is installed in a window frame.

Referring to FIGS. 1 and 2, a ventilation device according to an embodiment of the present invention may include: a heat exchange unit 10 fixed to a vertical frame 120 of a window frame 100 and playing a role of a passage through which first air and second air pass, and heat-exchanging the first air and the second air; and a main body unit 20 connected to the heat exchange unit 10 and disposed at the indoor side to purify the first air to supply the purified first air to the indoor side and to discharge the second air to the outside.

The first air may be outdoor air and the second air may be indoor air.

The window frame 100 has a rectangular frame shape mounted in an opening of a building, and a window 150 is mounted to be opened and closed in a sliding manner, and includes a horizontal frame 110 on which a rail is installed such that the upper surface and the lower surface of the window 150 are slidably movable, and a vertical frame 120 connected to the left and right sides of the horizontal frame 110.

Figure 3:
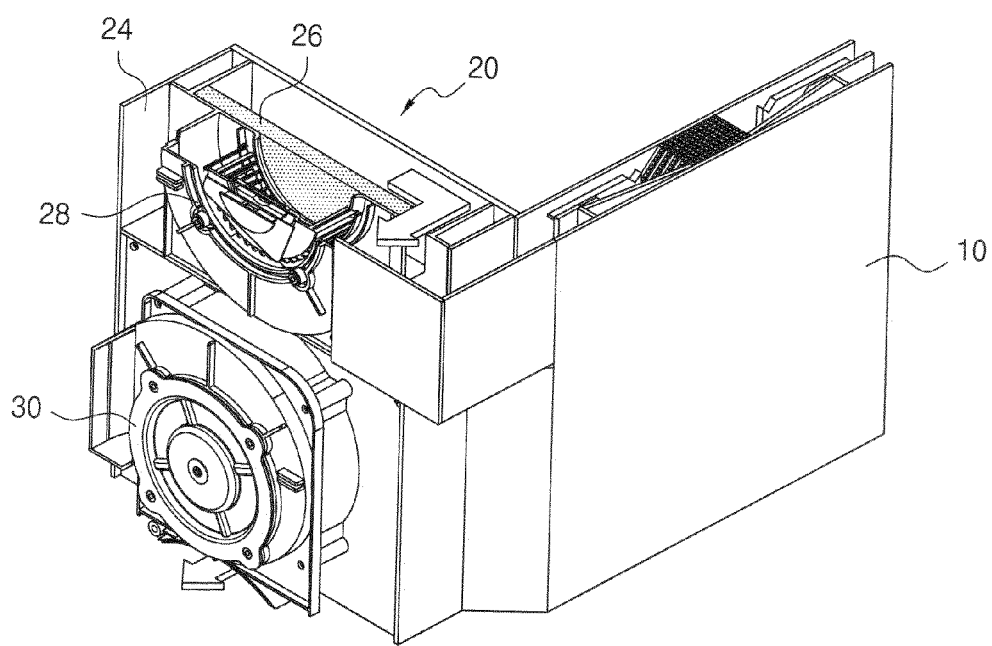
FIG. 3 is a partially cut perspective view of a ventilation device according to an embodiment of the present invention.
Figure 4:
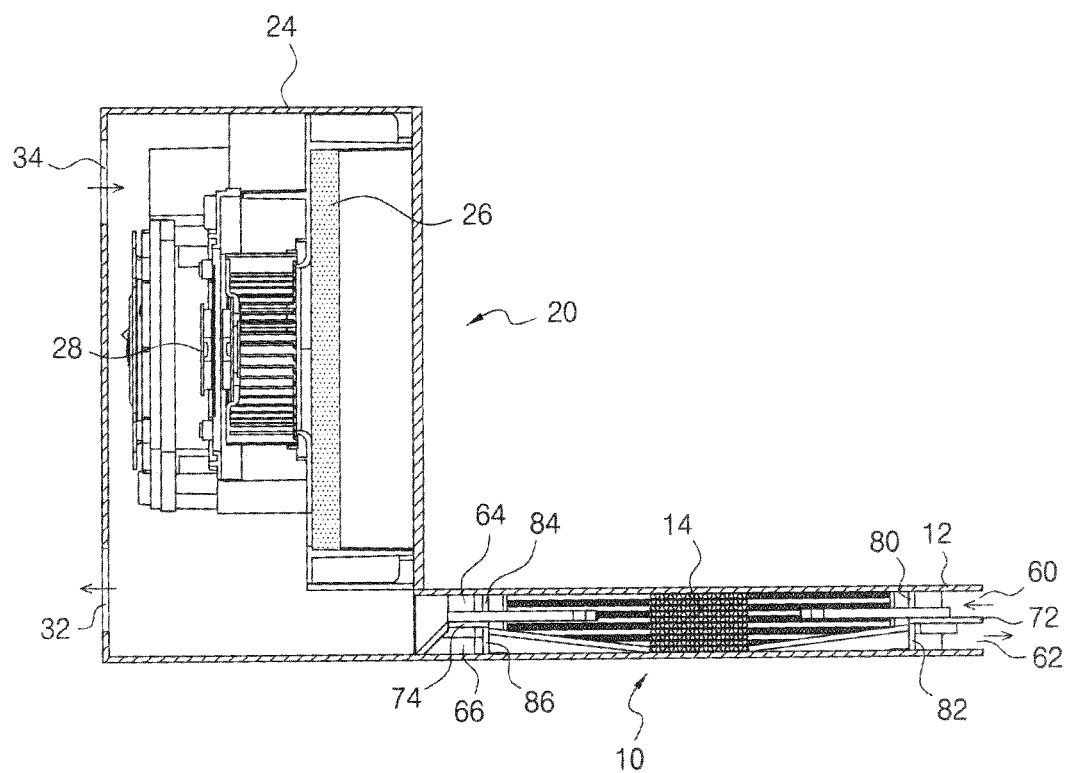
FIG. 4 is a cross-sectional view of a ventilation device according to an embodiment of the present invention.
Figure 5:
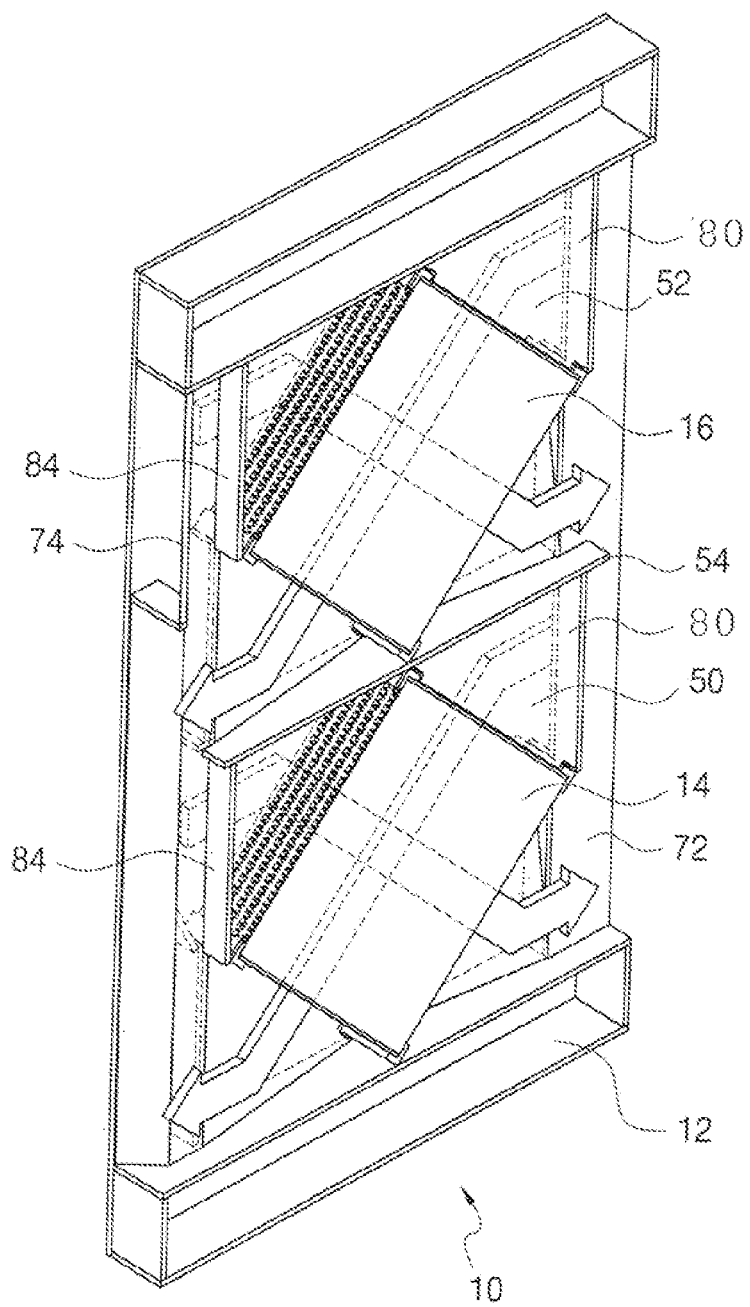
FIG. 5 is a perspective view of a heat exchange unit according to an embodiment of the present invention.
Figure 6:
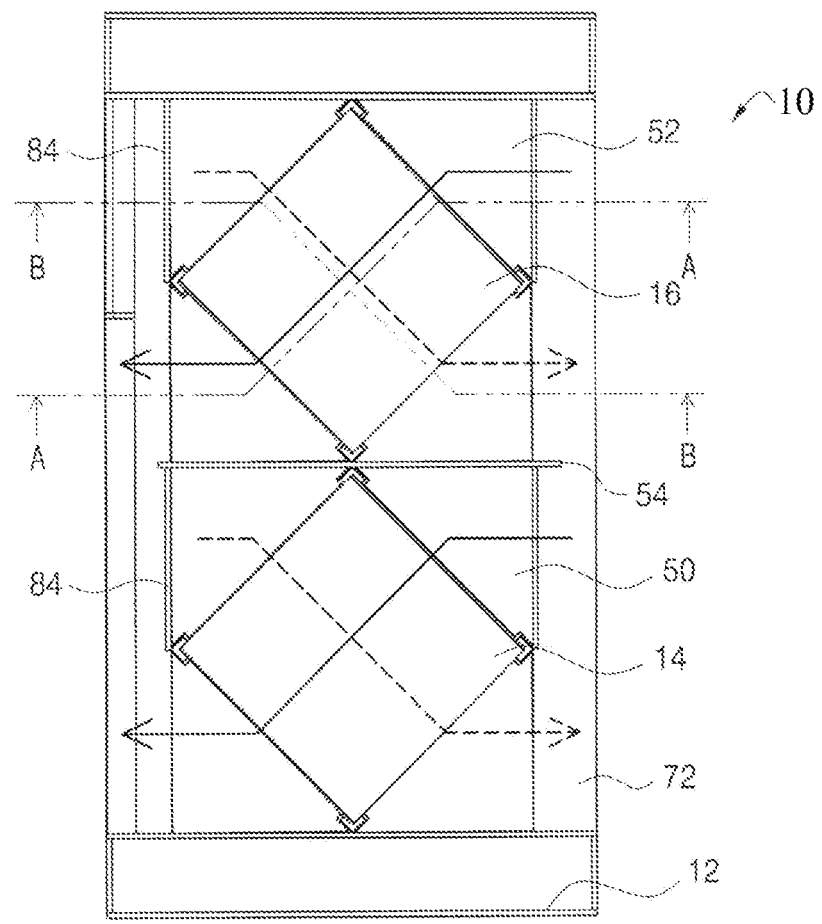
FIG. 6 is a plan view of a heat exchange unit according to an embodiment of the present invention.

The main body unit 20, as shown in FIGS. 3 and 4, may include: a housing 24, which is connected to the heat exchange unit 10, and provided with a first air supply port 32 through which purified first air is supplied to the indoor side and a second air inlet port 34 through which second air is sucked, respectively formed on the front surface of the heat exchanger unit 10; a filter 26 installed inside the housing 24 to filter the first air; a first air blowing unit 28 installed inside the housing 24 to forcibly blow the first air; and a second air blowing unit 30 that forcibly blows the second air.

The main body unit 20 is perpendicularly connected to the heat exchange unit 10 and is arranged on a wall surface at the indoor side by the side of the window frame 100 to prevent the window 150 from being hidden. That is, since the heat exchange unit 10 and the main body unit 20 are connected at a right angle, when the heat exchange unit 10 is installed in the window frame 100, the main body unit 20 is arranged on the indoor wall surface next to the window frame, so as to prevent the window 150 from being covered with the main unit 20.

The heat exchange unit 10 may be arranged to be vertically erected on the window frame 100 and the height direction of the heat exchange unit 10 may be arranged in the horizontal direction of the window frame 100, and the width direction of the heat exchange unit 10 may be arranged in the vertical direction of the window frame 100.

Therefore, it is possible to minimize the height of the heat exchange unit 10 and to enlarge the width thereof to thus reduce the area occupied by the width direction of the window frame 100, thereby preventing the degradation of the field of view of the window and the degradation of the sunlight transmission function.

A fixing bracket is fixed to the vertical frame 120 of the window frame 100, and the heat exchange unit 10 can be installed in the fixing bracket in a sliding manner. Otherwise, the heat exchange unit 10 can be directly fixed to the window frame 100.

The heat exchange unit 10 is formed to minimize the height thereof and to widely form the width thereof in order to minimize the area for covering the window and maintain the heat exchange area. To this end, in the present embodiment, a plurality of heat exchangers are horizontally arranged to maintain a heat exchange area, thereby minimizing the height of the heat exchange unit 10.

When the heat exchanger unit 10 according to the present embodiment is installed in a duct type, the plurality of heat exchangers are horizontally arranged, and thus the height of the heat exchange unit is lowered, thereby lowering the entire height of the ventilation device, so that the heat exchanger unit 10 can be installed so as to not be exposed from the ceiling.

As shown in FIGS. 5 to 8, the heat exchange unit 10 may include: a case 12 connected to the housing 24 of the main body unit 20 and fixed to the vertical frame 120 of the window frame 100, and having front and rear sides opened to suck and discharge the first air and the second air; and a plurality of heat exchangers 14 and 16 horizontally arranged inside the case 12 to exchange heat between the first air and the second air.

As described above, in the present embodiment, the plurality of heat exchangers 14 and 16 are arranged in the case 12 in the width direction of the case to thereby lower the height of the heat exchange unit 10, and maintain the heat exchange area.

Figure 9:
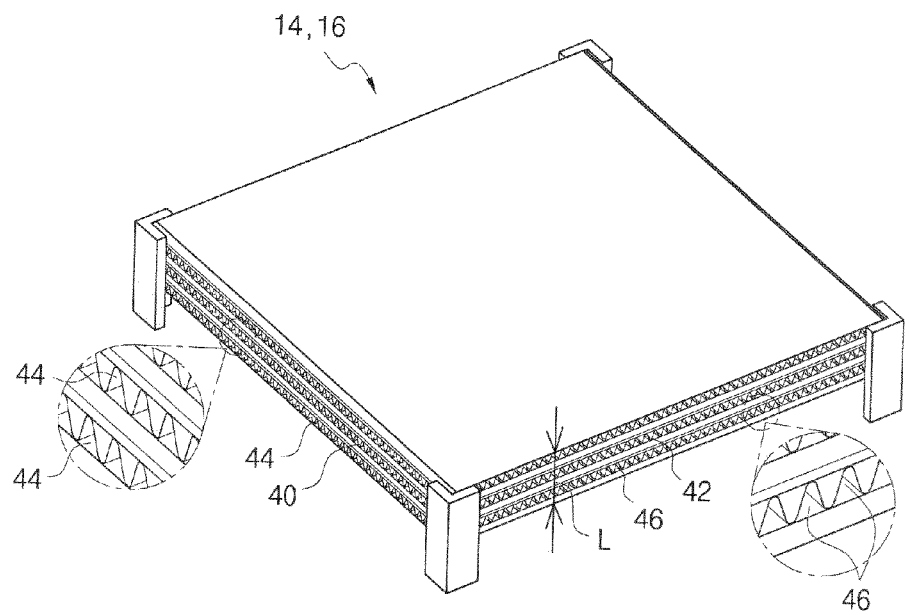
FIG. 9 is a perspective view of a heat exchanger according to an embodiment of the present invention.

As shown in FIG. 9, each of the heat exchangers 14 and 16 may include: a first heat exchange unit 40 having a first air passage 44 through which the first air passes; and a second heat exchange unit 42 alternately stacked with the first heat exchange unit 40 and having a second air passage 46 through which the second air passes. The first air passage 44 and the second air passage 46 are arranged to be perpendicular to each other such that the first air passing through the first air passage 44 and the second air passing through the second air passage 46 may be heat-exchanged.

Figure 10:
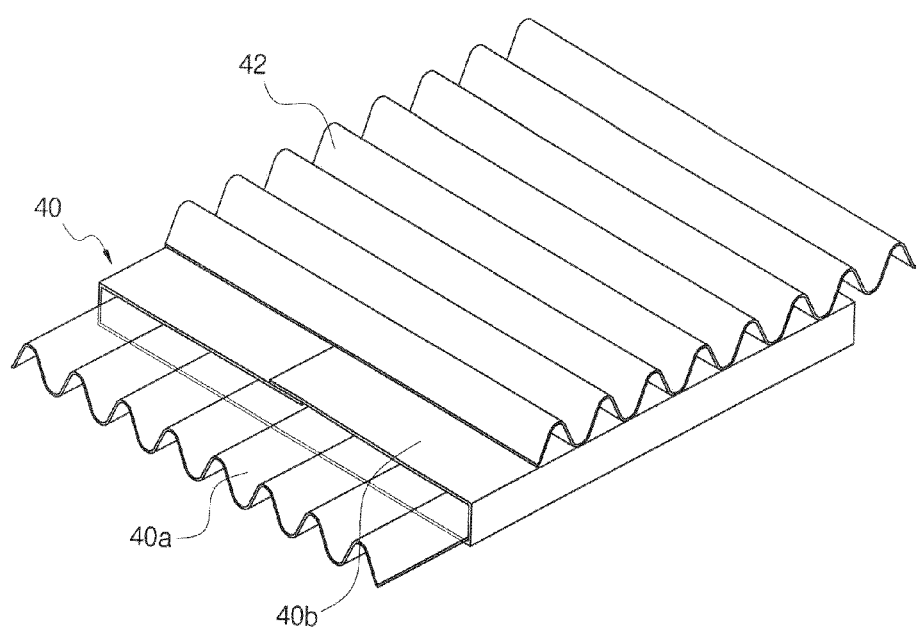
FIG. 10 is a partially cut perspective view of a heat exchanger according to an embodiment of the present invention.

As shown in FIG. 10, the first heat exchange unit 40 may include: a first corrugated plate 40a having a corrugated shape to form the first air passage 44; and a flat plate 40b arranged to surround the lower surface, both sides, and the upper surface of the first corrugated plate 40a to partition a space between the first air passage 44 and the second air passage 46.

The second heat exchange unit 42 may be formed of the second corrugated plate which is alternately stacked with the first heat exchange unit 40 and has a corrugated shape to form the second air passage 46.

The first heat exchange unit 40 is disposed to allow the flat plate to surround the lower surface, both side surfaces and the upper surface of the first corrugated plate 40a to partition a space between the first air passage 44 and the second air passage 46 to prevent the first air passing through the first air passage 44 and the second air passing through the second air passage 46 from being mixed with each other.

As described above, a plurality of the heat exchangers 14 and 16 can be arranged in the horizontal direction with the height (L) lowered to minimize the installation space. In addition, two or more heat exchangers can be installed according to the capacity of the ventilation device, and arranged in the diagonal direction.

For example, when the number of the heat exchangers is 2, a first space portion 50 in which the first heat exchanger 14 is installed in the horizontal direction in the case 12, and a second space portion 52 which is partitioned from the first space portion 50 by a partition rib 54 and in which the second heat exchanger 16 is installed, can be formed in the plurality of heat exchangers 14 and 16.

A first inlet port 60 through which the first air is sucked and a second outlet port 62 through which the second air is discharged may be formed on the front surface of the case 12, and a second inlet port 64 through which the second air is sucked and a first outlet port 66 through which the first air is discharged may be formed on the rear surface of the case 12.

A first separation plate 72 is installed on the front surface of the case 12 to separate the front surface of the case 12 in the height (L) direction of the heat exchanger, and a second separation plate 74 may be installed on the rear surface of the case 12 to vertically separate the rear surface of the case 12.

The front surface of the case 12 is separated in the height direction by the first separation plate 72, the upper portion of the case 12 may be formed to have the first inlet port 60 through which the first air is sucked, and the lower portion of the case 12 may be formed to have the second outlet port 62 through which the second air is discharged.

The rear surface of the case 12 is separated in the height direction by the second separation plate 74, and the upper portion of the case 12 is formed to have the second inlet port 64 through which the second air is sucked, and the lower portion of the case 12 may be formed to have the first outlet port 66 through which the first air is discharged.

The first inlet port 60 may be in communication with the first air passage 44 of the plurality of heat exchangers 14 and 16, and the second outlet port 62 may be in communication with the second air passage 46 of the plurality of heat exchangers 14 and 16.

A first blocking plate 80 may be installed in the first inlet port 60 to block a space between the second air passage 46 and the first inlet port 60 of the plurality of heat exchangers 14 and 16 to prevent the first air sucked into the first inlet port 60 from flowing into the second air passage 46.

A second blocking plate 82 may be installed in the second outlet port 62 to block a space between the first air passage 44 and the second outlet port 62 of the plurality of heat exchangers 14 and 16 to prevent the second air discharged via the second outlet port 62 from flowing into the first air passage 44.

A third blocking plate 84 may be installed in the second inlet port 64 to block a space between the first air passage 44 and the second inlet port 64 of the plurality of heat exchangers 14 and 16 to prevent the second air sucked into the second inlet port 64 from flowing into the first air passage 44.

A fourth blocking plate 86 may be installed in the first outlet port 66 to block a space between the second air passage 46 and the first outlet port 66 of the plurality of heat exchangers 14 and 16 to prevent the second air passing through the second air passage from being discharged via the first outlet port 66.

An inclined first guide plate 90 may be installed inside the front surface of the case 12 to guide the first air sucked through the first inlet port formed on the upper portion of the front surface of the case 12 to flow into the first air passage 44 of the heat exchangers 14 and 16. An inclined second guide plate 92 may be installed inside the rear surface of the case 12 to guide the first air passing through the first air passage 44 of the heat exchangers 14 and 16 to the first outlet port 66 formed at a lower portion of the rear surface of the case 12.

An inclined third guide plate 94 may be installed inside the front surface of the case 12 to guide the second air passing through the second air passage 46 of the heat exchangers 14 and 16 to the second outlet port 62 formed at a lower portion of the front surface of the case 12. A fourth guide plate 96 may be installed inside the rear surface of the case 12 to guide the second air sucked into the second inlet port 64 formed on the upper portion of the rear surface of the case 12 to the second air passage 46 of the heat exchanger 14 and 16.

When the plurality of heat exchangers 14 and 16 are arranged in one case 12, a diagonal line of the plurality of heat exchangers is arranged in a straight line inside the case 12. Accordingly, the first inlet port and the second outlet port may be alternately formed on the front surface of the case 12 in the width direction of the case 12, and the second inlet port and the first outlet port may be alternately formed on the rear surface of the case. In this case, a plurality of air passages are formed so that it is difficult to connect the plurality of air passages with pipes. In addition, the first air and the second air may be mixed with each other.

In the present embodiment, the first inlet port 60 and the second outlet port 62 are partitioned vertically on the front surface of the case 12, and the second inlet port 64 and the first outlet port 66 are partitioned vertically on the rear surface of the case 12, to thus form a single passage. Accordingly, it is easy to connect the piping with the respective ports, and the first air and the second air are prevented from being mixed with each other.

Figure 7:
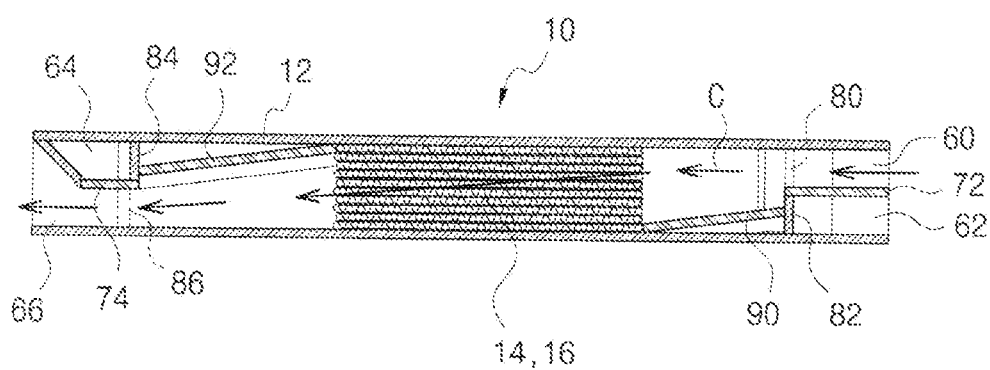
FIG. 7 is a cross-sectional view taken along line A-A' of FIG. 6.

The flow of the first air of the heat exchange unit for the ventilation device according to the present embodiment will be described with reference to FIG. 7. As shown in arrow C, the first air is sucked into the first inlet port 60 formed on the front surface of the case 12, is heat-exchanged with the second air while passing through the first air passage 44 of the heat exchangers 14 and 16, and is discharged through the first outlet port 66 formed at the lower portion of the rear surface of the case 12.

Here, the first blocking plate 80 is installed in the first inlet port 60 to block the inflow of the first air sucked into the first inlet port 60 into the second air passage 46, and the fourth blocking plate 86 is installed in the first outlet port 66 to prevent the first air from flowing toward the second inlet port 64.

Figure 8:
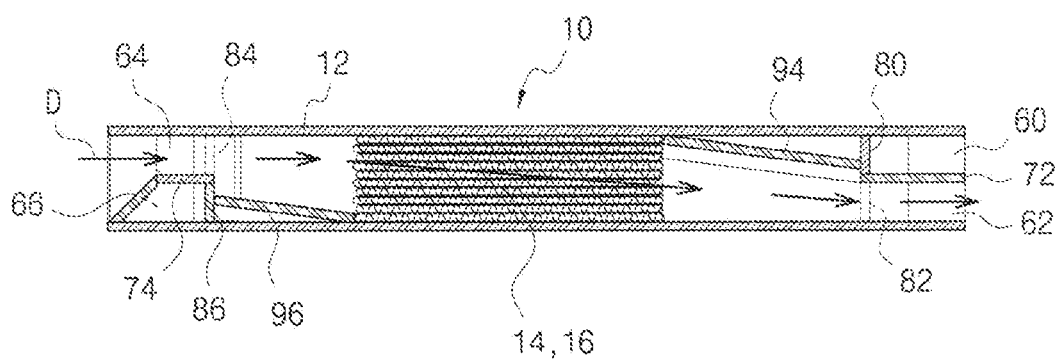
FIG. 8 is a cross-sectional view taken along line B-B' of FIG. 6.

In addition, the flow of the second air will be described with reference to FIG. 8. As shown in arrow D, the second air is sucked into the second inlet port 64 formed on the upper portion of the rear surface of the case 12, is heat-exchanged with the first air while passing through the second air passage 46 of the heat exchangers 14 and 16, and is discharged through the second outlet port 62 formed at the lower portion of the front surface of the case 12.

Here, the third blocking plate 84 is installed in the second inlet port 64 to block the inflow of the second air sucked into the second inlet port 64 into the first air passage 44, and the second blocking plate 82 is installed in the second outlet port 62 to prevent the second air from flowing toward the first inlet port 60.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention relates to a ventilation device for discharging polluted indoor air to the outside and supplying fresh outdoor air to the inside, wherein the ventilation device includes: a filter for filtering various harmful substances contained in the outdoor air; and a heat exchanger for heat-exchanging indoor air and outdoor air to minimize a change in the indoor temperature during ventilation. The heat exchanger of the present invention can reduce the height of the heat exchanger and widen the horizontal area, thereby minimizing the area of covering a window frame when installed in the window frame.

What is claimed is:

1. A heat exchange unit for a ventilation device comprising:
  a case having a first inlet port through which first air is sucked and a second outlet port through which second air is discharged, and a first outlet port through which the first air is discharged and a second inlet port through which the second air is sucked, wherein the first inlet port and the second outlet port are formed in a front surface of the case, and the first outlet port and the second inlet port are formed in a rear surface thereof; and
  two or more heat exchangers arranged inside the case in a vertical direction of the case, each heat exchanger having a first air passage through which the first air passes, and a second air passage through which the second air passes, wherein the first air passage and the second air passage diagonally cross each other to exchange heat between the first air and the second air,
  wherein the first inlet port and the second outlet port are partitioned in the vertical direction on the front surface of the case, and the second inlet port and the first outlet port are partitioned in the vertical direction on the rear surface of the case, and
  wherein the first air passage and the first inlet port communicate with each other, and the second air passage and the first inlet port are blocked from each other by a first blocking plate.

2. The heat exchange unit according to claim 1, wherein the case includes two or more space portions in which the two or more heat exchangers are arranged, respectively, wherein two neighboring space portions are partitioned by a partition plate.

3. The heat exchange unit according to claim 1, wherein the first inlet port and the second outlet port are separated by a first separation plate formed in a height direction of the each heat exchanger, and the first inlet port and the second outlet port are formed on an upper portion and a lower portion of the front surface of the case, respectively, or vice versa.

4. The heat exchange unit for a ventilation device according to claim 1, wherein the second inlet port and the first outlet port are separated by the second separation plate formed in a height direction, and the second inlet port and the first outlet port are formed on an upper portion and a lower portion of the rear surface of the case, respectively, or vice versa.

5. The heat exchange unit according to claim 1, wherein the first air passage and the first outlet port communicate with each other, and the second air passage and the first outlet port are blocked from each other by a fourth blocking plate.

6. The heat exchange unit according to claim 1, wherein the second air passage and the second outlet port communicate with each other, and the first air passage and the second outlet port are blocked from each other by a second blocking plate.

7. The heat exchange unit according to claim 1, wherein the second air passage and the second inlet port communicate with each other, and the first air passage and the second inlet port are blocked from each other by a third blocking plate.

8. The heat exchange unit according to claim 1, wherein the each heat exchanger comprises:
  a first heat exchange unit including a first corrugated plate having a corrugated shape to form a first air passage, and
  a second heat exchange unit including a second corrugated plate having a corrugated shape to form a second air passage, the second heat exchange unit being alternately stacked with the first heat exchange unit, and
  a flat plate arranged to surround a lower surface, both side surfaces and an upper surface of the first corrugated plate to partition a gap between the first air passage and the second air passage.

9. A heat exchange unit for a ventilation device comprising:
  a case where a front surface and a rear surface are opened to allow first air and second air to pass therethrough; and
  two or more heat exchangers inside the case in a vertical direction of the case, each heat exchanger having a first air passage through which the first air passes, and a second air passage through which the second air passes, wherein the first air passage and the second air passage diagonally cross each other,
  wherein the front surface of the case is vertically separated by a first separation plate, a first inlet port through which the first air is sucked is formed in an upper portion of the front surface, and a second outlet port through which the second air is discharged is formed in a lower portion of the front surface,
  the rear surface of the case is vertically separated by a second separation plate, a second inlet port through which the second air is sucked is formed an upper portion of the rear surface, a first outlet port through which the first air is discharged is formed in a lower portion of the rear surface, the first air passage is in communication with the first inlet port and the first outlet port, and is blocked from the second inlet port and the second outlet port by a third blocking plate and a second blocking plate, respectively, and the second air passage is in communication with the second inlet port and the second outlet port, and is blocked from the first inlet port and the first outlet port by a first blocking plate and a fourth blocking plate, respectively.

\* \* \* \* \*